(12) United States Patent
Malonson

(10) Patent No.: US 12,029,242 B2
(45) Date of Patent: Jul. 9, 2024

(54) DEVICES AND METHODS FOR REHYDRATING PLANT MATTER AND INFUSING PLANT MATTER WITH TERPENES AND OTHER VOLATILE COMPOUNDS

(71) Applicant: Full Melt Media, LLC, Toluca Lake, CA (US)

(72) Inventor: Nathan Travis Malonson, Pollock Pines, CA (US)

(73) Assignee: Full Melt Media, LLC, Placerville, CA (US)

( * ) Notice: Subject to any disclaimer, the term of this patent is extended or adjusted under 35 U.S.C. 154(b) by 786 days.

(21) Appl. No.: 17/202,737

(22) Filed: Mar. 16, 2021

(65) Prior Publication Data

US 2022/0295875 A1    Sep. 22, 2022

(51) Int. Cl.

| | |
|---|---|
| A61L 9/04 | (2006.01) |
| A01G 27/04 | (2006.01) |
| A24F 25/02 | (2006.01) |
| B01D 53/26 | (2006.01) |
| B01D 53/28 | (2006.01) |
| B01J 20/22 | (2006.01) |
| B01J 20/28 | (2006.01) |
| B65D 85/00 | (2006.01) |
| F24F 6/04 | (2006.01) |

(52) U.S. Cl.
CPC .............. *A24F 25/02* (2013.01); *A01G 27/04* (2013.01); *B01D 53/261* (2013.01); *B01D 53/28* (2013.01); *B01J 20/22* (2013.01); *B01J 20/2805* (2013.01); *F24F 6/043* (2013.01)

(58) Field of Classification Search
CPC ......... A61L 9/12; A47J 31/405; A47J 31/467; B65D 85/804; B01J 20/22; B01J 20/2805
USPC ........................ 206/0.5; 99/316, 323; 239/44
See application file for complete search history.

(56) References Cited

U.S. PATENT DOCUMENTS

| | | | | |
|---|---|---|---|---|
| 4,549,693 | A * | 10/1985 | Barlics ...................... | A61L 9/12 206/0.5 |
| 5,000,383 | A * | 3/1991 | van der Heijden ....... | A61L 9/12 239/47 |
| 2003/0080197 | A1* | 5/2003 | Tuomikoski .............. | A61L 9/12 239/57 |
| 2006/0081721 | A1* | 4/2006 | Caserta ................... | A61L 9/035 239/135 |
| 2012/0275932 | A1* | 11/2012 | Sharma ................... | A61L 9/122 417/66 |

(Continued)

*Primary Examiner* — Luan K Bui
(74) *Attorney, Agent, or Firm* — Levine Bagade Han LLP

(57) ABSTRACT

Disclosed are devices and methods for rehydrating plant matter or plant-derived matter and infusing such matter with terpenes and other volatile compounds. In one embodiment, a device to rehydrate and infuse plant or plant-derived matter comprises a first housing portion comprising a central column and a second housing portion configured to be coupled or locked to the first housing portion. The central column of the first housing portion can compromise a rehydrating agent, an infusing agent, and a hydrosol infuser. A method of using the device is also disclosed. The method can comprise rotating the first housing portion with respect to the second housing portion to open the device, placing the device within a bag or container containing the plant or plant-derived matter, and sealing the bag or container containing the plant or plant-derived matter and the device.

20 Claims, 10 Drawing Sheets

(56) References Cited

U.S. PATENT DOCUMENTS

2023/0355948 A1* 11/2023 Dombrowski ...... A61M 39/162

* cited by examiner

DEVICES AND METHODS FOR REHYDRATING PLANT MATTER AND INFUSING PLANT MATTER WITH TERPENES AND OTHER VOLATILE COMPOUNDS

FIELD OF TECHNOLOGY

The present disclosure relates generally to the field of infusers and rehydrating devices for plant matter or plant-derived matter and, more specifically, to improved devices and methods for rehydrating plant matter or plant-derived matter and infusing such matter with terpenes and other volatile compounds.

BACKGROUND

Plant matter used for medicinal or palliative purposes, such as cannabis or hemp, can become overdried or lose their flavor and aroma naturally over time or if stored or cured improperly. Moreover, concentrates, extracts, or distillates derived from such plant matter can also lose their aroma and flavor as the terpenes, flavonoids, thiols, and other naturally occurring molecules in such plant-derived matter decay over time. In some cases, retailers and dispensaries selling these types of plant or plant-derived matter are often forced to discard products that lose their flavor and aroma even when such products may still retain much of their chemical potency.

Traditional methods of rehydrating such plant matter involve spraying dried plant matter with water or wrapping the dried plant matter in a moist paper towel for a period of time. These methods can result in the plant matter becoming soggy and unpalatable. Another popular method for rehydrating plant matter involves placing a piece of bread in a sealed container with the dried plant matter and allowing the bread to passively transfer moisture to the dried plant matter. However, this method can introduce mold and other unwanted microbes to the plant matter.

While some systems have been introduced to infuse terpenes into plant matter, such systems require large and expensive equipment and require a significant amount of time to set up and clean up. Moreover, there are no products that allow a user to both rehydrate and infuse plant or plant-derived matter with aromas or flavors simultaneously.

Therefore, a solution is needed which addresses the above shortcomings and disadvantages. Such a solution should also allow a retailer or purveyor of plant-based products to add to the shelf-life of such plant-based products and restore their aromatic and flavor profiles. Such a solution should be portable and simple to operate. Moreover, such a solution should be cost-effective to manufacture and assemble.

SUMMARY

Disclosed are devices and methods for rehydrating plant matter or plant-derived matter and infusing such matter with terpenes and other volatile compounds. In one embodiment, a device to rehydrate and infuse plant or plant-derived matter comprises a first housing portion and a second housing portion.

The first housing portion can comprise a central column. The central column can comprise one or more column vents defined along at least one lateral side of the central column. The central column can comprise a plurality of dividing walls configured to divide an interior space within the central column into multiple compartments. Each of the dividing walls can comprise one or more dividing wall vents allowing the multiple compartments to be in fluid communication with one another.

The device can further comprise a rehydrating agent configured to rehydrate plant or plant-derived matter stored with the device. The rehydrating agent can be housed within one of the compartments within the central column. In some embodiments, the rehydrating agent can be a rehydrating gel composed of water, hydrosol, a polysaccharide stabilizer (e.g., xanthan gum), agar, and salt.

The device can also comprise an infusing agent configured to infuse the plant or plant-derived matter with volatile compounds. The infusing agent can be housed within one of the other compartments of the central column. In some embodiments, at least one of the volatile compounds is a terpene selected from the group consisting of alpha bisabolol, alpha phellandrene, alpha pinene, alpha-terpineol, beta caryophyllene, beta-pinene, bisabolene, cadinene, camphene, camphor, carvacrol, caryophyllene oxide, cedrene, cinnamaldehyde, citral, citronella, citronellol, delta-3-carene, eucalyptol, eugenol, farnesene, fenchol, gamma terpinene, geranial, geraniol, guaiol, humulene, limonene, linalool, longifolene, myrcene, nerol, nerolidol, ocimene, para-cymene, phytol, pinene, pulegone, terpineol, terpinolene, and valencene.

In addition, the device can comprise a hydrosol infuser housed within the central column. The hydrosol infuser can be a plant-derived hydrosol configured to further infuse the plant or plant-derived matter with aromas and fragrances.

The central column can comprise one or more elongate absorbents housed within its various compartments. The elongate absorbents can serve as carriers, containers, or holders for the rehydrating agent, the infusing agent, and the hydrosol infuser. For example, at least one of the rehydrating agent, the infusing agent, and the hydrosol infuser can be injected into the elongate absorbents.

At least one of the elongate absorbents can comprise a hollow cavity defined within the elongate absorbent. At least one of the rehydrating agent and the hydrosol infuser can be injected into the hollow cavity of the elongate absorbent.

The device can further comprise a column cap configured to cap or close off an open or distal end of the central column. The column cap can cap or close off the open or distal end of the central column when elongate absorbents (e.g., hollow cotton tubes and solid cotton tubes) carrying or holding the rehydrating agent, the infusing agent, and the hydrosol infuser are housed within the central column.

The first housing portion can further comprise a plurality of first locking tabs positioned radially outward of the central column. At least one of the first locking tabs can comprise one or more first locking tab vents.

The second housing portion can comprise a plurality of second locking tabs. At least one of the second locking tabs can comprise one or more second locking tab vents.

The plurality of second locking tabs can be configured to engage with the plurality of first locking tabs to prevent the first housing portion from separating from the second housing portion when the device is in an assembled configuration. Portions of the second locking tabs can be configured to be positioned in a space separating the central column from the plurality of first locking tabs when the device is in the assembled configuration.

Each of the plurality of first locking tabs can comprise a first beveled end and a first locking protrusion. Moreover, each of the plurality of second locking tabs can comprise a second beveled end and a second locking protrusion. The first locking protrusion can be configured to interlock or catch onto the second locking protrusion to prevent the first housing portion from separating from the second housing portion when the device is in the assembled configuration.

The first housing portion can further comprise a first housing shell comprising one or more main vent openings defined along the first housing shell. The main vent openings can be formed by a first set of blocking panels extending from the first housing shell and arranged in a castellated configuration.

The second housing portion can further comprise a second set of blocking panels. The second set of blocking panels can be configured to obstruct the main vent openings when the device is rotated into a closed configuration by rotating the second housing portion relative to the first housing portion.

The compartments within the central column can be in fluid communication with an external environment surrounding the device via the column vents, the second locking tab vents, the first locking tab vents, and the main vent openings when the device is twisted into an open configuration. In some embodiments, at least some of the column vents, the second locking tab vents, the first locking tab vents, and the main vent openings can be positioned radially offset from one another when the device is in the open configuration.

Moreover, at least one of the first set of blocking panels can comprise a blocking piece protruding radially inward. The blocking piece can be configured to act as a stopper to block at least one of the second set of blocking panels when the device is in the assembled configuration and the second housing portion is rotated with respect to the first housing portion. The second housing portion can be unable to be rotated 360 degrees as a result of the blocking piece. The second housing portion can be rotated between approximately 20 degrees and 60 degrees (e.g., 45 degrees) as a result of the blocking piece.

A method of rehydrating plant or plant-derived matter and infusing such plant or plant-derived matter with volatile or aromatic compounds is also disclosed. The method can comprise rotating the first housing portion of the device with respect to the second housing portion of the device to open the device. The method can also comprise the step of placing the device within a bag or container containing the plant or plant-derived matter. The method can further comprise the step of sealing the bag or container containing the plant or plant-derived matter and the device.

In some embodiments, the plant matter can be cannabis plant matter. In these embodiments, the plant-derived matter can be a concentrate, extract, or distillate of the cannabis plant matter.

In these and other embodiments, the plant matter can be hemp plant matter. In these embodiments, the plant-derived matter can be a concentrate, extract, or distillate of the hemp plant matter.

A method of assembling a device for rehydrating and infusing plant or plant-derived matter is also disclosed. The method can comprise positioning a first elongate absorbent comprising the rehydrating agent within one of the plurality of compartments within the central column of the first housing portion. The method can also comprise positioning a second elongate absorbent comprising the infusing agent comprising terpenes within another one of the plurality of compartments within the central column. The method can further comprise positioning a third elongate absorbent comprising the hydrosol infuser within yet another one of the plurality of compartments of the central column.

The method can also comprise the step of capping or closing an open end of the central column (e.g., with the column cap) and locking the first housing portion to the second housing portion of the device by pushing the plurality of second locking tabs of the second housing portion into the space separating the central column from the plurality of first locking tabs and allowing the first locking tabs to interlock with the second locking tabs to prevent the first housing portion from separating from the second housing portion.

Also disclosed is another embodiment of a rehydrating and infusing device. The device can comprise a first housing portion comprising a central column and a second housing portion configured to couple to the first housing portion and prevent the first housing portion from separating from the second housing portion when the device is in an assembled configuration. The device can further comprise a rehydrating agent configured to rehydrate a plant or plant-derived matter stored with the device. The rehydrating agent can be housed within at least part of the central column. The rehydrating agent can comprise water, hydrosol, a polysaccharide stabilizer, agar, and salt.

The device can further comprise an infusing agent configured to infuse the plant or plant-derived matter with terpenes. The infusing agent can be housed within at least part of the central column.

In some embodiments, the rehydrating agent can comprise approximately 48.6% water (wt %), 48.6% hydrosol (wt %), 1.2% polysaccharide stabilizer (wt %), 1.2% agar (wt %), and 0.4% salt.

DETAILED DESCRIPTION

Figure 1A:
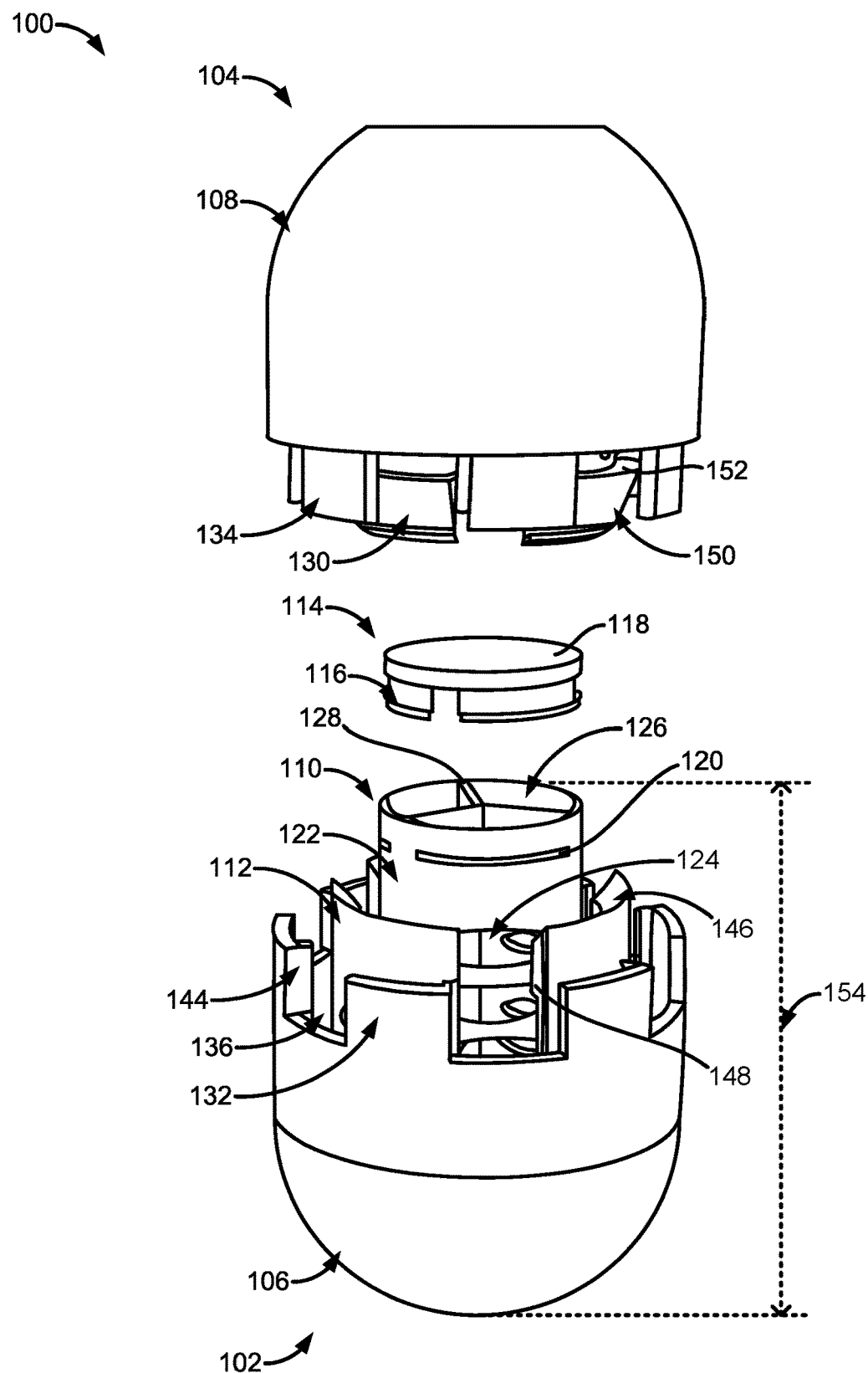
FIG. 1A illustrates an exploded view of one embodiment of several parts of a device for re-hydrating and infusing plant or plant-derived matter with terpenes or other volatile compounds.

FIG. 1A illustrates an exploded view of one embodiment of several parts of a device 100 for rehydrating plant or plant-derived matter 700 (see, e.g., FIG. 7) and infusing such plant or plant-derived matter 700 with terpenes or other volatile compounds. The device 100 can comprise a first housing portion 102 configured to attach or couple to a second housing portion 104. In some embodiments, the first housing portion 102 can irreversibly attach or couple to the second housing portion 104 such that the first housing portion 102 is unable to be separated from the second housing portion 104 once the first housing portion 102 is attached or coupled to the second housing portion 104 without breaking the device 100 or a part thereof. In these and other embodiments, the first housing portion 102 can be rotatable with respect to the second housing portion 104 when the first housing portion 102 is attached or otherwise coupled to the second housing portion 104.

As shown in FIG. 1A, when the device 100 is substantially egg-shaped or shaped as an ovoid, the first housing portion 102 can be referred to as a bottom half of the egg-shaped device 100 and the second housing portion 104 can be referred to as a top half of the egg-shaped device 100.

Although the device 100 is shown as egg-shaped or shaped substantially as an ovoid with flat top and bottom surfaces, it is contemplated by this disclosure that the device 100 can be substantially spherical, cuboid-shaped, square-shaped, cylindrical, bi-pyramidal or rhomboid, or a combination thereof.

Figure 1B:
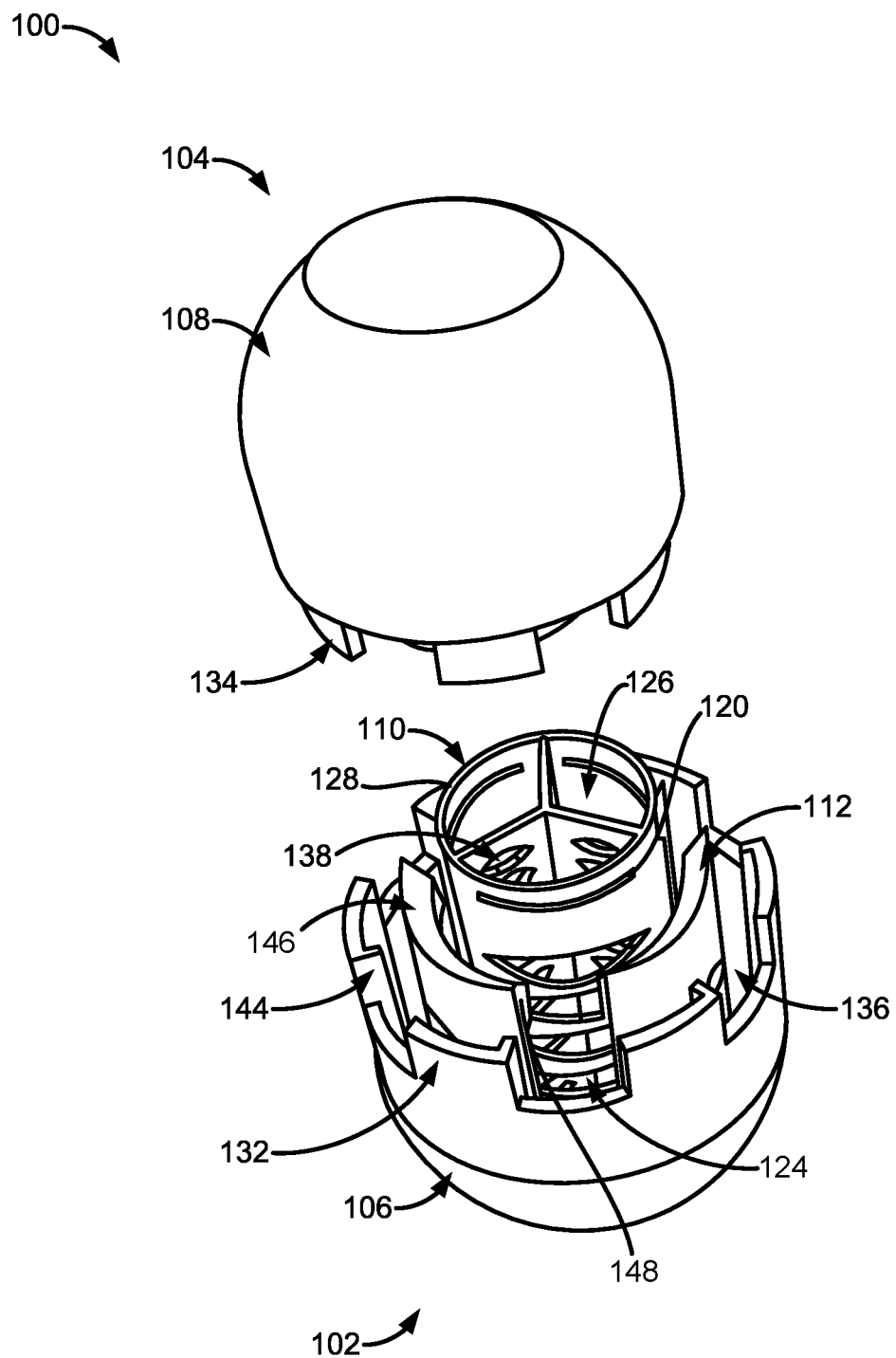
FIG. 1B illustrates the device of FIG. 1A with a second housing portion separated from a first housing portion.

When the device 100 is substantially egg-shaped or substantially shaped as an ovoid, each of the first housing portion 102 and the second housing portion 104 can be substantially shaped as a hemisphere or dome-shaped. As shown in FIGS. 1A and 1B, a top surface of the second housing portion 104 and a bottom surface of the first housing portion 102 can be substantially flat to allow the device 100 to be placed on a surface or on a bed of plant-matter or plant-derived matter without tipping over.

FIG. 1A also illustrates that the first housing portion 102 can comprise a first housing shell 106 and the second housing portion 104 can comprise a second housing shell 108. When the first housing portion 102 is attached or coupled to the second housing portion 104, the first housing shell 106 and the second housing shell 108 can be the main parts of the device 100 visible to a user. When the device 100 is substantially egg-shaped, the first housing shell 106 and the second housing shell 108 can look like eggshells of the egg-shaped device 100.

The first housing portion 102 can comprise a central column 110 extending from the first housing shell 106. As shown in FIG. 1A, the central column 110 can extend above or beyond the first housing shell 106 such that a distal or top portion of the central column 110 can be accessed by an individual tasked with assembling the device 100.

The first housing portion 102 can also comprise a plurality of first locking tabs 112 positioned radially outward of the central column 110. For example, the plurality of first locking tabs 112 can be positioned or located in a space separating the first housing shell 106 from the central column 110.

The device 100 can further comprise a column cap 114 configured to cap a distal/top or open end of the central column 110. The column cap 114 can comprise a plurality of cap locking tabs 116 extending vertically downward from a solid cap body 118 of the column cap 114. The column cap 114 can cap the distal/top or open end of the central column 110 when the column cap 114 is pushed onto the distal end or top end of the central column 110 and the plurality of cap locking tabs 116 extend, at least partially, into cap slits 120 defined along lateral sides 122 of the central column 110.

The column cap 114 can cap the distal/top or open end of the central column 110 when the central column 110 is filled with one or more rehydrating and infusing agents. The rehydrating and infusing agents will be discussed in more detail in later sections of this disclosure.

As depicted in FIG. 1A, the central column 110 can comprise one or more column vents 124 defined along at least one lateral side 122 of the central column 110. The column vents 124 can allow water vapor and volatile or aromatic compounds (e.g., volatile organic compounds) emitted by the rehydrating and infusing agents within the central column 110 to diffuse or otherwise pass into a space or an environment external to the central column 110.

As shown in FIG. 1A, an interior space within the central column 110 can be divided or separated into multiple compartments 126 by one or more dividing walls 128. Although three dividing walls 128 are shown in the various figures, it is contemplated by this disclosure and it should be understood by one of ordinary skill in the art that the central column 110 can comprise one, two, or four or more dividing walls 128. The dividing walls 128 can connect or join together to form the multiple compartments 126. For example, the dividing walls 128 can connect or join together in a medial or middle portion of the central column 110 such that the dividing walls 128 are positioned radially with respect to the central column 110.

Although FIGS. 1A-1C, 4A, and 5A-5B illustrate the central column 110 as being substantially cylindrical-shaped or tube-shaped, it is contemplated by this disclosure that the central column 110 can be substantially shaped as an elongate cuboid, a conic or frusto-conic, a pyramid, or a combination thereof.

FIG. 1A further illustrates that the second housing portion 104 can comprise a plurality of second locking tabs 130. The second locking tabs 130 can be configured to engage with the plurality of first locking tabs 112 of the first housing portion 102 to prevent the first housing portion 102 from separating from the second housing portion 104 when the device 100 is in an assembled configuration 306 (see, e.g., FIGS. 3A and 3B). At least a portion of each of the second locking tabs 130 is configured to be positioned or located in a space separating the central column 110 from the plurality of first locking tabs 112 when the device 100 is in the assembled configuration 306.

FIG. 1A also illustrates that the first housing portion 102 can comprise a first set of blocking panels 132 extending or jutting out from the first housing shell 106. The second housing portion 104 can comprise a second set of blocking panels 134 can be positioned radially inward of the second housing shell 108.

In some embodiments, the first set of blocking panels 132 can be arranged in a castellated configuration such that each of the first set of blocking panels 132 is separated from another one of its neighboring panels by a gap or space.

These gaps or spaces between the first set of blocking panels 132 can serve as main vent openings 136 for the water vapor and volatile or aromatic compounds (e.g., volatile organic compounds) to exit the device 100.

Figures 3A, 3B:
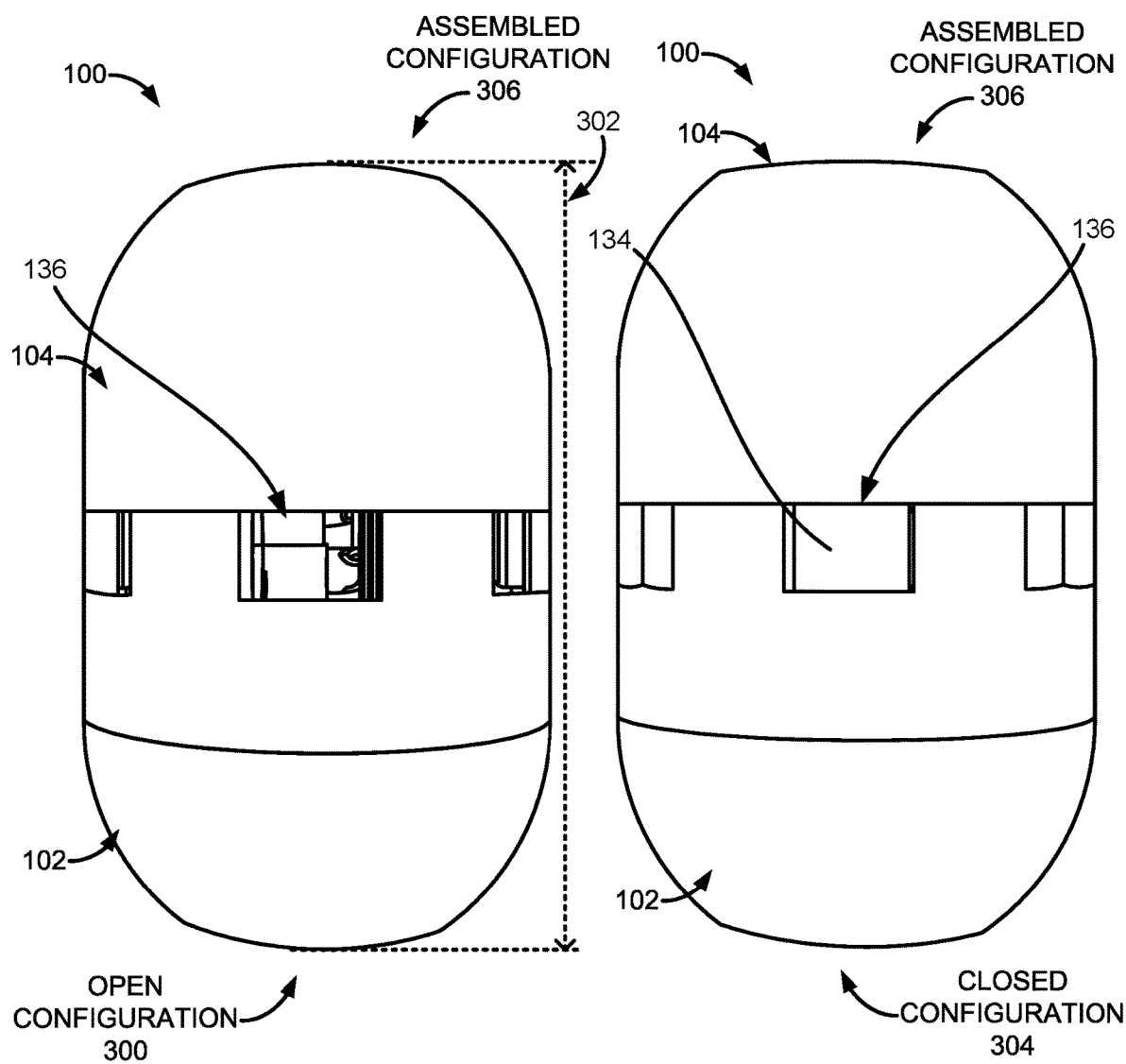
FIG. 3A illustrates one embodiment of the device in an open configuration such that one or more main vents are opened.
FIG. 3B illustrates one embodiment of the device in a closed configuration such that the main vents are closed.

The second set of blocking panels 134 can be configured to obstruct or block the main vent openings 136 when the second housing portion 104 is coupled to the first housing portion 102 (that is, the plurality of first locking tabs 112 are engaged or interlocked with the plurality of second locking tabs 130) and the second housing portion 104 is rotated with respect to the first housing portion 102 such that the device 100 is in a closed configuration 304 (see, e.g., FIG. 3B).

FIG. 1B illustrates the device 100 with the second housing portion 104 separated from the first housing portion 102. As shown in FIG. 1B, the dividing walls 128 within the central column 110 can comprise one or more dividing wall vents 138 defined along a length or height of each of the dividing walls 128. The dividing wall vents 138 can be openings or slits defined along the length or height of each of the dividing walls 128 to allow the multiple compartments 126 of the central column 110 to be in fluid communication with one another. When the multiple compartments 126 are in fluid communication with one another, water vapor and/or volatile compounds or aromatic compounds (e.g., volatile organic compounds) within the compartments 126 can mix with one another.

Figure 1C:
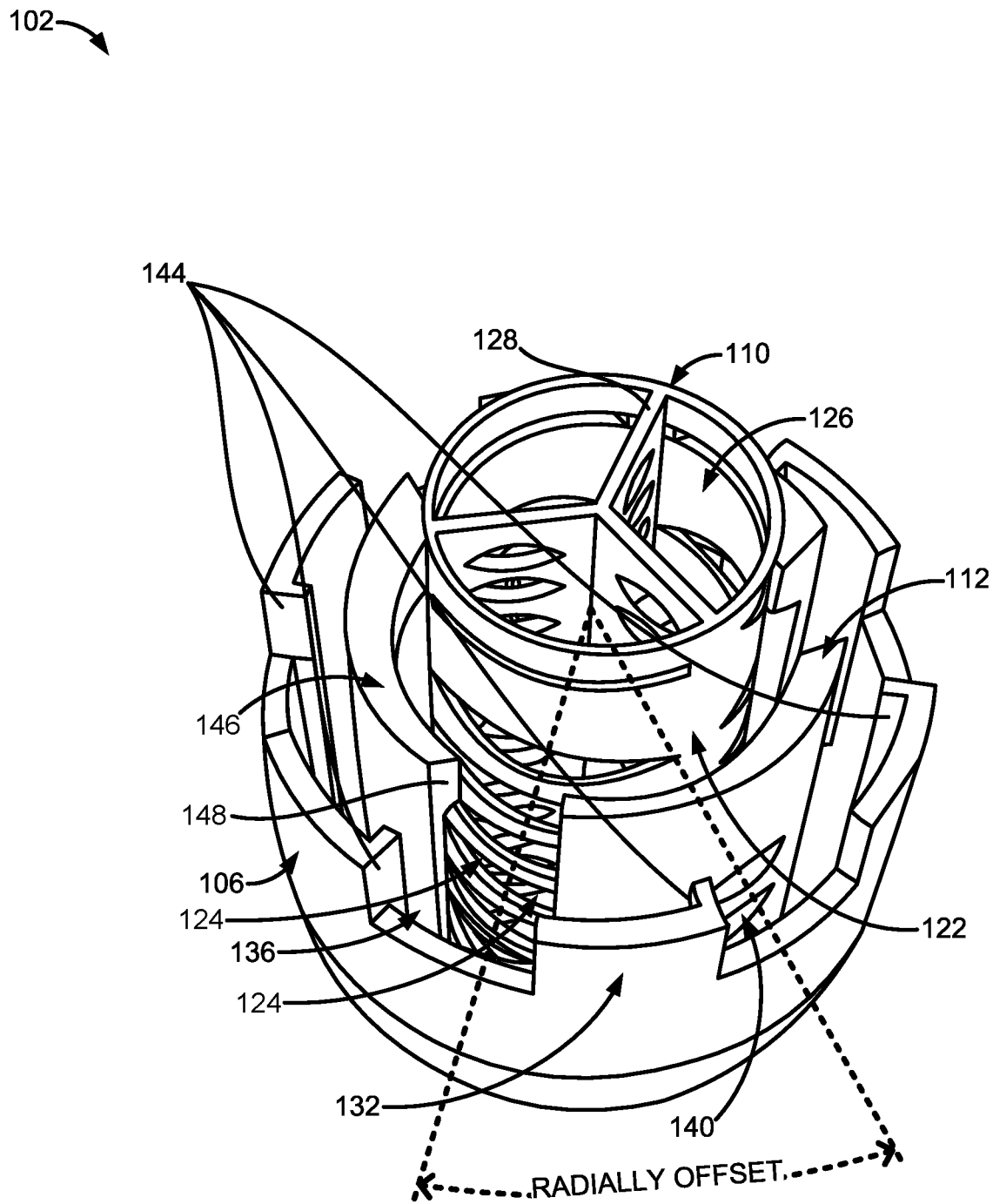
FIG. 1C illustrates one embodiment of a first housing portion of the device.

FIG. 1C illustrates a perspective view of one embodiment of the first housing portion 102 of the device 100. As shown in FIG. 1C, at least one of the first locking tabs 112 can comprise one or more first locking tab vents 140. The first locking tab vents 140 can be slits, openings, or apertures defined along a length or height of each of the first locking tabs 112.

FIG. 1C also illustrates that the first locking tab vents 140 can be positioned or arranged radially offset from the column vents 124 on the central column 110. For example, the first locking tab vents 140 can be positioned or arranged in such a way that the first locking tab vents 140 are not radially in line or aligned with the column vents 124. Moreover, the first locking tab vents 140 can be positioned or arranged radially offset from the main vent openings 136. Arranging the first locking tab vents 140 radially offset from the column vents 124 and the main vent openings 136 can create a labyrinth or maze-like structure within the device 100 such that water vapor and/or volatile or aromatic compounds diffuse at a slower rate out of the device 100.

In other embodiments, at least part of the first locking tab vents 140 can be positioned or arranged in line or aligned with at least part of the column vents 124. In these and other embodiments, at least part of the first locking tab vents 140 can be positioned or arranged in line or aligned with at least part of the main vent openings 136.

Figure 1D:
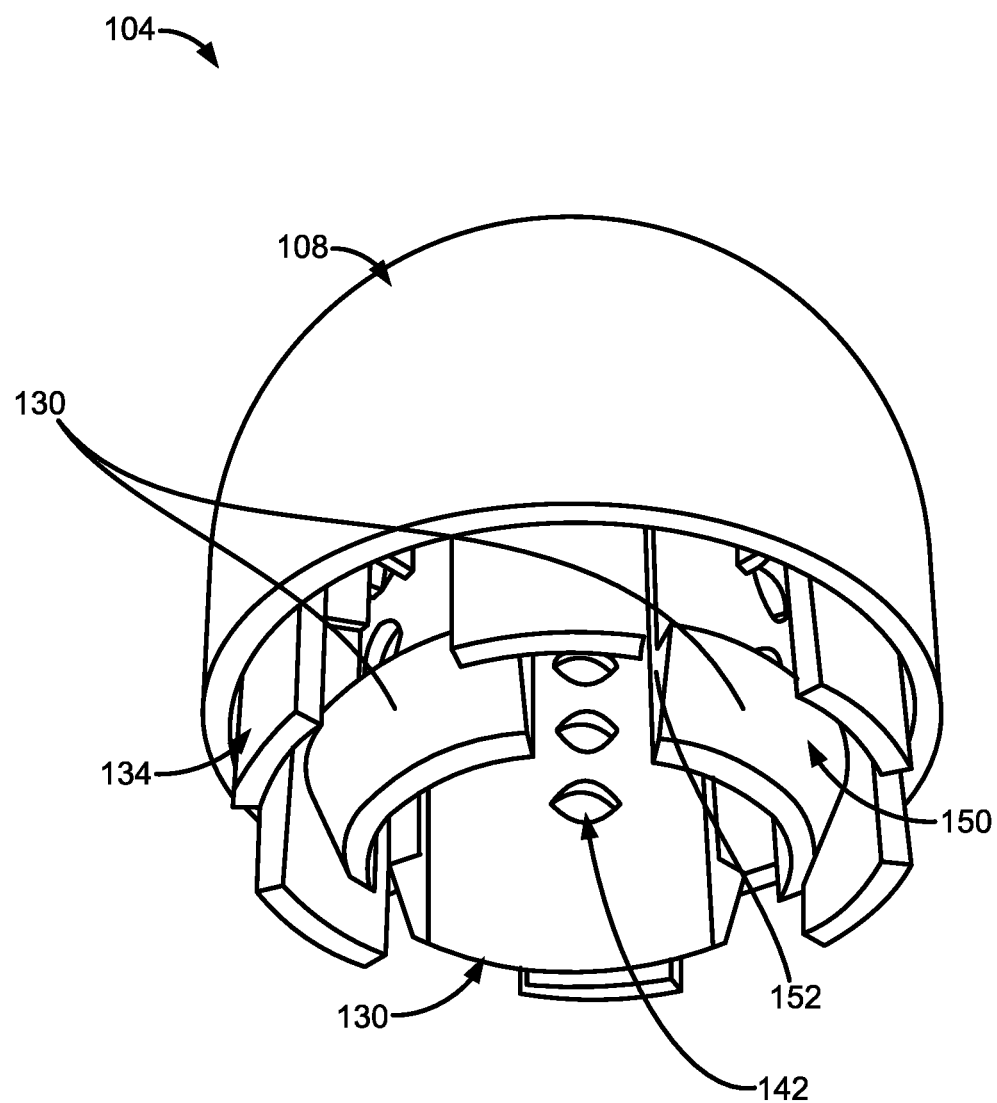
FIG. 1D illustrates one embodiment of a second housing portion of the device.

FIG. 1D illustrates a perspective view of one embodiment of the second housing portion 104 of the device 100. As shown in FIG. 1D, at least one of the second locking tabs 130 can comprise one or more second locking tab vents 142. The second locking tab vents 142 can be slits, openings, or apertures defined along a length or height of each of the second locking tabs 130.

The second locking tab vents 142 can be positioned or arranged radially offset from the first locking tab vents 140 on the first locking tabs 112. The second locking tab vents 142 can also be positioned or arranged radially offset from the column vents 124 on the central column 110. For example, the second locking tab vents 142 can be positioned or arranged in such a way that the second locking tab vents 142 are not radially in line or aligned with either the first locking tab vents 140 or the column vents 124.

In some embodiments, the second locking tab vents 142 can be positioned or arranged radially offset from the main vent openings 136. Arranging the second locking tab vents 142 radially offset from the first locking tab vents 140, the column vents 124, and the main vent openings 136 can create a labyrinth or maze like structure within the device 100 such that water vapor and/or volatile or aromatic compounds diffuse slower out of the device 100.

In other embodiments, at least part of the second locking tab vents 142 can be positioned or arranged in line or aligned with at least part of the first locking tab vents 140 and/or the column vents 124. In these and other embodiments, at least part of the second locking tab vents 142 can be positioned or arranged in line or aligned with at least part of the main vent openings 136.

In all such embodiments, the compartments 126 within the central column 110 can be in fluid communication with an external environment surrounding the device 100 via the column vents 124, the second locking tab vents 142, the first locking tab vents 140, and the main vent openings 136 when the device 100 is twisted into an open configuration 300 (see, e.g., FIG. 3A). The device 100 can be twisted into the open configuration 300 when the second housing portion 104 is rotated or twisted with respect to the first housing portion 102. When the device 100 is twisted into the open configuration 300, the water vapor and/or volatile/aromatic molecules or compounds within the central column 110 can exit or diffuse out of the central column 110 through the column vents 124 and then through at least one of the second locking tab vents 142 and the first locking tab vents 140. The water vapor and/or volatile/aromatic molecules or compounds can then exit or diffuse out of the device 100 through the main vent openings 136.

One technical problem faced by the applicant is how to ensure the terpenes or other volatile/aromatic molecules within the central column 110 do not diffuse out too quickly and how the gels and liquids making up the rehydrating agent, the infusing agent, and the hydrosol infuser do not inadvertently spill out of the device 100. One technical solution is the labyrinth or maze-like internal structure formed by the radially-offset vents and openings when the device 100 is in the assembled configuration 306.

In some embodiments, the column vents 124 (see, e.g., FIGS. 1B, 1C, and 5B) can be substantially crescent-shaped or shaped as semicircles. In other embodiments, the column vents 124 can be slit-shaped, oval-shaped, diamond-shaped, biconvex or lens-shaped, circular, rectangular, or a combination thereof.

The column vents 124 can be defined along the lateral sides 122 of the central column 110 in columns or stacked on top of one another. For example, the column vents 124 can be arranged in three columns or stacks along three sides of the central column 110. In other embodiments, the column vents 124 can be staggered or arranged vertically offset from one another.

The column vents 124 can have a column vent maximum width and a column vent maximum height. The column vent maximum width can be between approximately 10.0 mm and 16.0 mm. The column vent maximum height can be between approximately 5.0 mm and 10.0 mm.

In these and other embodiments, the second locking tab vents 142 (see, e.g., FIG. 1D) can be substantially lens-shaped or biconvex. In other embodiments, the second locking tab vents 142 can be crescent-shaped or shaped as semicircles, slit-shaped, oval-shaped, diamond-shaped, circular, rectangular, or a combination thereof.

The second locking tab vents 142 can be arranged in columns or stacked on top of one another along each of the second locking tabs 130. In other embodiments, the second locking tab vents 142 can be arranged in a staggered manner or vertically offset from one another along each of the second locking tabs 130.

Moreover, the first locking tab vents 140 (see, e.g., FIG. 1C) can be substantially lens-shaped or biconvex. In other embodiments, the first locking tab vents 140 can be crescent-shaped or shaped as semicircles, slit-shaped, oval-shaped, diamond-shaped, circular, rectangular, or a combination thereof.

The first locking tab vents 140 can be arranged in columns or stacked on top of one another along each of the first locking tabs 112. In other embodiments, the first locking tab vents 140 can be arranged in a staggered manner or vertically offset from one another along each of the first locking tabs 112.

Each of the first locking tab vents 140 and the second locking tab vents 142 can have a tab vent maximum width and a tab vent maximum height. The tab vent width can be between approximately 10.0 mm and 16.0 mm. The tab vent maximum height can be between approximately 5.0 mm and 10.0 mm.

In some embodiments, the main vent openings 136 (see, e.g., FIGS. 1A, 1B, 1C, and 5B) can be substantially rectangular-shaped as a result of the castellated configuration of the first set of blocking panels 132. In other embodiments, the main vent openings 136 can be shaped as semi-circles, triangles, or a combination thereof.

Each of the main vent openings 136 can have a main vent maximum height and a main vent maximum width. The main vent maximum height can be between approximately 8 mm and 15 mm (e.g., 10 mm). The main vent maximum width can be between approximately 10 mm and 20 mm (e.g., 15.5 mm).

As previously discussed, the central column 110 can comprise one or more dividing walls 128 and each of the dividing walls 128 can comprise dividing wall vents 138 defined along the length or height of each of the dividing walls 128 to allow the multiple compartments 126 of the central column 110 to be in fluid communication with one another. The dividing wall vents 138 (see, e.g., FIGS. 1B, 1C, and 5A) can be substantially lens-shaped or biconvex. In other embodiments, the dividing wall vents 138 can be crescent-shaped or shaped as semicircles, slit-shaped, oval-shaped, diamond-shaped, circular, rectangular, or a combination thereof.

Each of the dividing wall vents 138 can have a dividing wall vent maximum height and a dividing wall vent maximum width. In some embodiments, the dividing wall vent maximum height can be between approximately 1.5 mm and 5.0 mm (e.g., 2.5 mm) and the dividing wall vent maximum width can be between approximately 3.0 mm and 10.0 mm (e.g., 5.0 mm).

FIG. 1A also illustrates that the central column 110 can have a column height 154. The column height 154 can be measured from a base of the central column 110 to the distal or open end of the central column 110. In some embodiments, the column height 154 can be between 60 mm and 80 mm. For example, the column height 154 can be approximately 70 mm.

FIGS. 1A-1D also illustrate that at least one of the first set of blocking panels 132 of the first housing portion 102 can comprise a blocking piece 144 protruding radially inward of the first housing shell 106. The blocking piece 144 can be configured to act as a stopper to block at least one of the second set of blocking panels 134 when the device 100 is in the assembled configuration 306 (see, e.g., FIGS. 3A and 3B) and the second housing portion 104 is rotated with respect to the first housing portion 102. The blocking piece 144 can prevent the second housing portion 104 from being rotated 360 degrees with respect to a fixed starting point along the first housing portion 102. The second housing portion 104 can be rotated (clockwise or counterclockwise) between approximately 20 degrees and 60 degrees (e.g., 45 degrees) as a result of the blocking piece 144.

FIGS. 1A-1D further illustrate that each of the plurality of first locking tabs 112 can comprise a first beveled end 146 and a first locking protrusion 148. The first locking protrusion 148 can be formed by part of the first beveled end 146. For example, the first locking protrusion 148 can be an overhang or ledge extending laterally from the first locking tab 112.

Moreover, each of the plurality of second locking tabs 130 can comprise a second beveled end 150 and a second locking protrusion 152. The second locking protrusion 152 can be formed by part of the second beveled end 150. For example, the second locking protrusion 152 can be an overhang or ledge extending laterally from the second locking tab 130.

In some embodiments, the first beveled ends 146 of the first locking tabs 112 can allow the first locking tabs 112 to more easily slide or insert into a space separating the second locking tabs 130 and the second housing shell 108. The first beveled ends 146 can also allow the first locking tabs 112 to more easily slide or insert into the space separating the second locking tabs 130 and the second set of blocking panels 134. Moreover, the second beveled ends 150 of the second locking tabs 130 can allow the second locking tabs 130 to more easily slide or insert into a space separating the first locking tabs 112 and the central column 110.

Once the distal ends of the first locking tabs 112 and the second locking tabs 130 have slid into position, the first locking protrusions 148 can interlock or catch onto the second locking protrusions 152 to lock the first housing portion 102 to the second housing portion 104. When the first housing portion 102 is locked onto the second housing portion 104, the first housing portion 102 can be prevented from being separated from the second housing portion 104. Furthermore, once the first housing portion 102 is locked onto the second housing portion 104 via the locking tabs, the device 100 is considered to be in the assembled configuration 306.

In some embodiments, the first housing portion 102 and the second housing portion 104 (including all of the columns, shells, walls, and tabs making up such portions) can be made in part of a food-grade polymeric material. For example, the first housing portion 102 and the second housing portion 104 can be made in part of polylactic acid (PLA), high-density polyethylene (HDPE), low-density polyethylene (LDPE), polycarbonate (PC), polyethylene terephthalate (PET), polypropylene (PP), or a combination thereof.

In other embodiments, at least one of the first housing portion 102 and the second housing portion 104 (or part(s) thereof) can be made of a metallic material or metal alloy (e.g., stainless steel or aluminum alloy), a ceramic material, an organic material such as wood, or a combination thereof. In certain embodiments, at least one of the first housing portion 102 and the second housing portion 104 can be made in part of a combination of a polymeric material and a metallic material/metal alloy, a ceramic, or wood.

The first housing portion 102, the second housing portion 104, or a combination thereof can be manufactured or fabricated using injection molding, cast molding, fused deposition modeling (FDM) or 3D-printing, computer numerical control (CNC) machining, or a combination thereof.

Figure 2A:
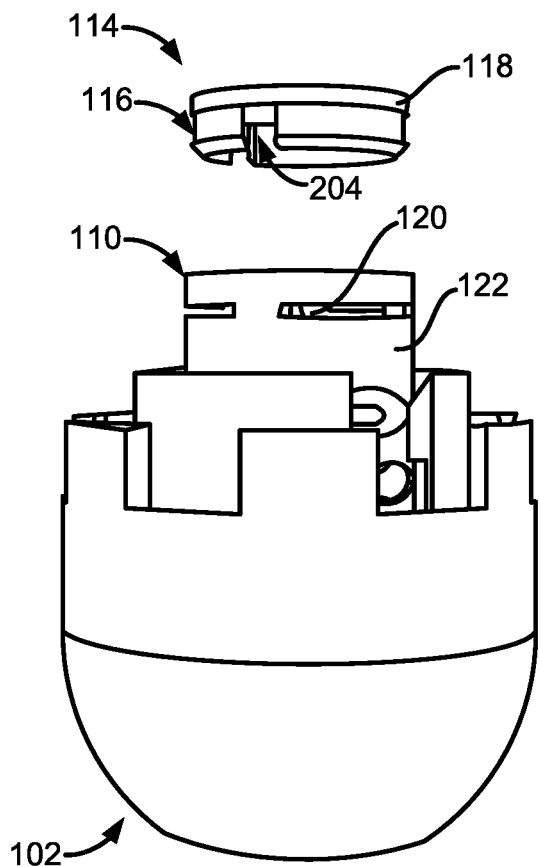
FIG. 2A illustrates one embodiment of the first housing portion with a column cap separated from a central column.

FIG. 2A illustrates one embodiment of the first housing portion 102 with a column cap 114 separated from the central column 110. As previously discussed, the column cap 114 can be configured to cap or close off a distal or open end of the central column 110. The column cap 114 can cap or close off the distal or open end of the central column 110 once the central column 110 is filled with one or more rehydrating agents 500, infusing agents 502, and/or hydrosol infusers 504 (see, e.g., FIGS. 5A and 5B).

Figure 2B:
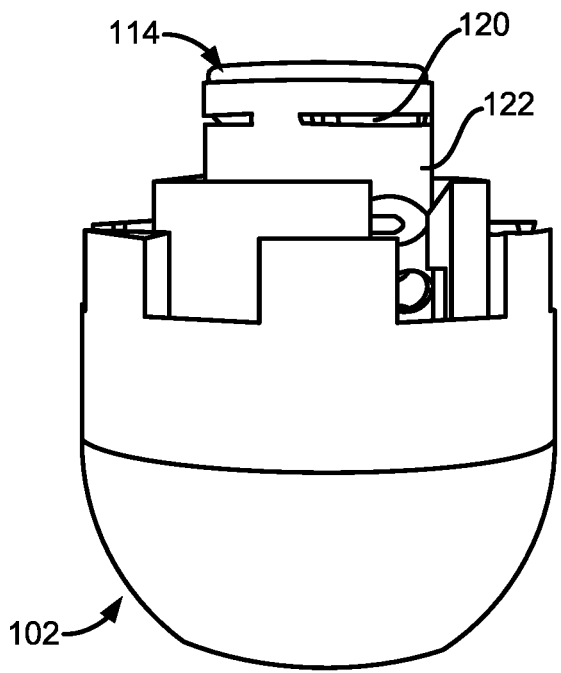
FIG. 2B illustrates one embodiment of the first housing portion with the column cap capping the central column.

FIG. 2B illustrates one embodiment of the first housing portion 102 with the column cap 114 capping the distal end of the central column 110. Once the central column 110 is capped by the column cap 114, the rehydrating agent 500, the infusing agent 502, and/or the hydrosol infuser 504 can be securely housed within the various compartments 126 within the central column 110. Moreover, once the central column 110 is capped by the column cap 114 and the second housing portion 104 is attached or otherwise coupled to the first housing portion 102, the device 100 can be placed upright with either the first housing portion 102 or the second housing portion 104 serving as the base of the device 100 (e.g., the portion in contact with a placement surface).

Figure 2C:
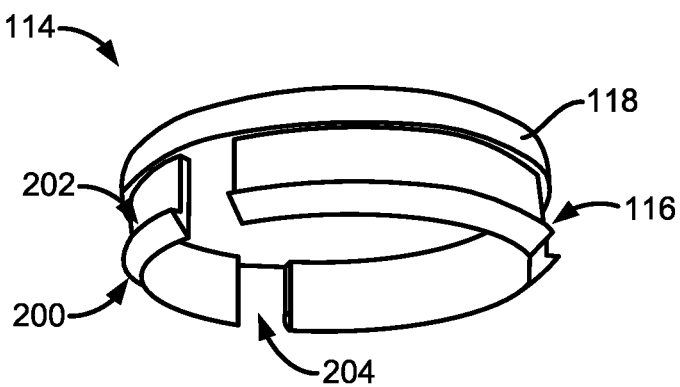
FIG. 2C illustrates one embodiment of the column cap.

FIG. 2C illustrates a close-up view of one embodiment of the column cap 114. As shown in FIG. 2C, the column cap 114 can comprise a plurality of cap locking tabs 116 extending vertically downward from a cap body 118 of the column cap 114. The column cap 114 can cap the distal or open end of the central column 110 when the column cap 114 is pushed or pressed onto the distal/open end of the central column 110.

FIG. 2C also illustrates that each of the plurality of cap locking tabs 116 can comprise a tab beveled end 200. The tab beveled end 200 can be a tapered or sloped end of the cap locking tabs 116 to allow the plurality of cap locking tabs 116 to slide into the central column 110 more easily. The tab beveled end 200 can also define or form a tab protrusion 202 extending radially outward relative to the cap body 118. At least a portion of the tab protrusion 202 can extend into the cap slits 120 of the central column 110 when the column cap 114 is pushed or pressed onto the central column 110.

FIG. 2C also illustrates that the cap locking tabs 116 can be separated from one another by one or more tab openings 204. The tab openings 204 can allow the column cap 114 to be pressed or pushed onto the open end of the central column 110 even when the dividing walls 128 within the interior of the central column 110 extend up to or close to the open end. The number of tab openings 204 can, thus, match the number of dividing walls 128 within the central column 110.

FIG. 3A illustrates one embodiment of the device 100 in an open configuration 300 such that the main vent openings 136 are not obstructed by the second set of blocking panels 134 of the second housing portion 104. In some embodiments, the device 100 can be translated or manipulated into the open configuration 300 by rotating or twisting the second housing portion 104 with respect to the first housing portion 102 (or vice versa). For example, the device 100 can be opened by twisting the second housing portion 104 (the top half) clockwise (when viewed from the top) with respect to the first housing portion 102 (the bottom half). With the main vent openings 136 unobstructed or unblocked, the water vapor and/or volatile or aromatic compounds (e.g., the volatile organic compounds) within the device 100 can more easily diffuse out of the device 100.

FIG. 3A also illustrates that the device 100 in its assembled configuration 306 can have a device height 302. The device height 302 can be measured from the base of the device 100 (e.g., the base or bottom side of the first housing portion 102) to the top of the device 100 (e.g., the apex or top of the second housing portion 104) when the device 100 is placed upright. In some embodiments, the device height 302 can be between 80 mm and 100 mm. For example, the column height 154 can be approximately 91 mm.

FIG. 3B illustrates one embodiment of the device 100 in a closed configuration 302 such that the main vent openings 136 are obstructed, at least in part, by the second set of blocking panels 134 of the second housing portion 104. In some embodiments, the device 100 can be translated or manipulated into the closed configuration 304 by rotating or twisting the second housing portion 104 with respect to the first housing portion 102 (or vice versa). For example, the device 100 can be closed by twisting the second housing portion 104 (the top half) counterclockwise (when viewed from the top) with respect to the first housing portion 102 (the bottom half). With the main vent openings 136 obstructed or blocked, the water vapor and/or volatile or aromatic compounds (e.g., the volatile organic compounds) within the device 100 can be hindered from diffusing out of the device 100.

In some embodiments, the blocking pieces 144 (see, e.g., FIGS. 1A, 1B, 1C, and 4A) of the first housing portion 102 can be arranged or positioned such that the second set of blocking panels 134 make contact with the blocking pieces 144 only when the main vent openings 136 are fully closed or fully opened. For example, the second housing portion 104 can be rotated or twisted (e.g., clockwise, when viewed from the top) with respect to the first housing portion 102 until at least one of the second set of blocking panels 134 of the second housing portion 104 makes contact with or is stopped by one of the blocking pieces 144 of the first housing portion 102. After this rotation step, the main vent openings 136 can be in the open configuration 300 when the blocking panel 134 makes contact with the blocking piece 144. The user can then rotate or twist the second housing portion 104 in the opposite direction (e.g., counterclockwise, when viewed from the top) with respect to the first housing portion 102 until the blocking panel 134 makes contact with a neighboring blocking piece 144. After this subsequent rotation step, the main vent openings 136 can be closed or obstructed and the device 100 can now be in the closed configuration 304.

A user can store the device 100 to be used at a later time when the device 100 is in the closed configuration 304. A user can also partially close the main vent openings 136 in order to slow the diffusion of water vapor and/or volatile or aromatic compounds (e.g., the volatile organic compounds) out of the device 100.

Figure 4A:
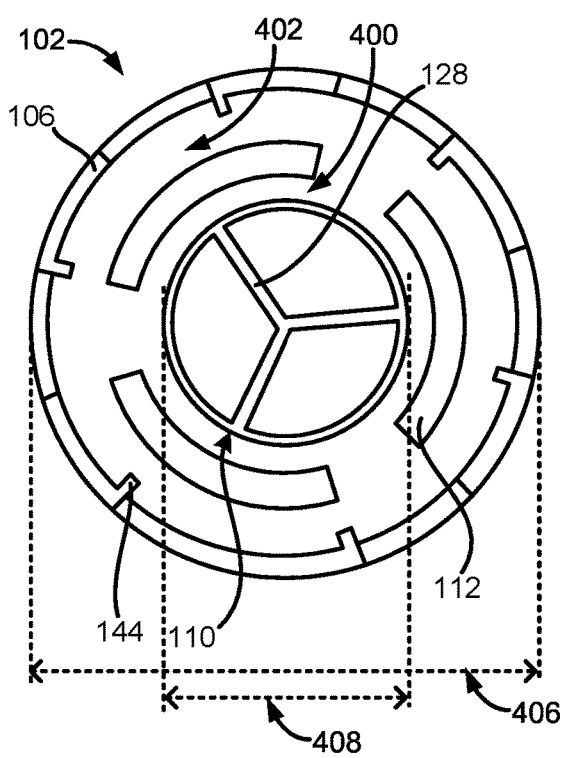
FIG. 4A illustrates a top plan view of one embodiment of the first housing portion.
Figure 4B:
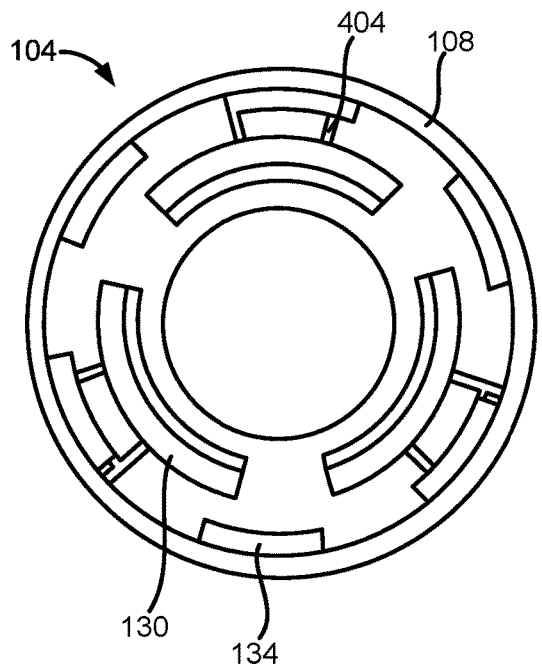
FIG. 4B illustrates a top plan view of one embodiment of the second housing portion.

FIGS. 4A and 4B illustrate top plan views of embodiments of the first housing portion 102 and the second housing portion 104, respectively. FIG. 4A illustrates that the first housing portion 102 can comprise an inner separation space 400 separating the central column 110 from the first locking tabs 112 and an outer separation space 402 separating the first locking tabs 112 from the first housing shell 106.

The inner separation space 400 can be a substantially annular-shaped gap or cavity separating the central column 110 from the first locking tabs 112. The outer separation space 402 can be a substantially annular-shaped gap or cavity separating the first locking tabs 112 from the first housing shell 106. The outer separation space 402 can be concentric with the inner separation space 400.

When the device 100 is in the assembled configuration 306, at least a segment of each of the second locking tabs 130 can be positioned within the inner separation space 400. The second locking tabs 130 can rotate with respect to the first locking tabs 112 when the second locking tabs 130 are positioned within the inner separation space 400.

Moreover, when the device 100 is in the assembled configuration 306, at least a segment of each of the second set of blocking panels 134 can be positioned within the outer separation space 402. The second set of blocking panels 134 can rotate or turn when the second set of blocking panels 134 are positioned within the outer separation space 402.

FIG. 4A also illustrates that the first housing portion 102 can also have a housing diameter or width along the widest portion of the first housing portion 102. Since the widest portion of the first housing portion 102 is also the widest portion of the overall device 100, the housing diameter or width can also be referred to as a device diameter 406 or device width. In some embodiments, the device diameter 406 can be between 40 mm and 60 mm. For example, the device diameter 406 can be approximately 56 mm.

FIG. 4A further illustrates that the central column 110 can have a column diameter 408 or column width. In some embodiments, the column diameter 408 can be between approximately 20 mm and 30 mm. For example, the column diameter 408 can be approximately 28 mm.

Moreover, the walls, shells, panels, or tabs of the device 100 can have a wall thickness. In some embodiments, the wall thickness can be between approximately 1.0 mm and 4.0 mm.

In some embodiments, the device 100 can be designed to be portable or transportable such that the device height 302 is between 80 mm and 100 mm (e.g., 91 mm) and the device diameter 406 is between 40 mm and 60 mm (e.g., 56 mm). In these embodiments, the device 100 can rehydrate or infuse up to 1 pound of plant or plant-derived matter.

In other embodiments, the size of the device 100 can be scaled down or scaled up as long as a ratio of the device diameter 406 to device height 302 is between approximately 1:1.6 and 1:2.0.

In these and other embodiments, the size of the central column 110 can also be scaled down or scaled up as long as a ratio of the column diameter 408 to the column height 154 is between approximately 1:2.5 and 1:3.0.

FIG. 4B illustrates that the second housing portion 104 can comprise one or more reinforcement walls 404. The reinforcement walls 404 can reinforce or brace each of the second locking tabs 130. The reinforcement walls 404 can extend radially and connect the second locking tabs 130 to the second housing shell 108, the second set of blocking panels 134, or a combination thereof. The reinforcement walls 404 can provide structural support to the internal structures (e.g., the walls, tabs, panels, etc.) within the second housing portion 104 to prevent the internal structures from breaking when the second housing portion 104 is rotated or twisted with respect to the first housing portion 102.

Figure 5A:
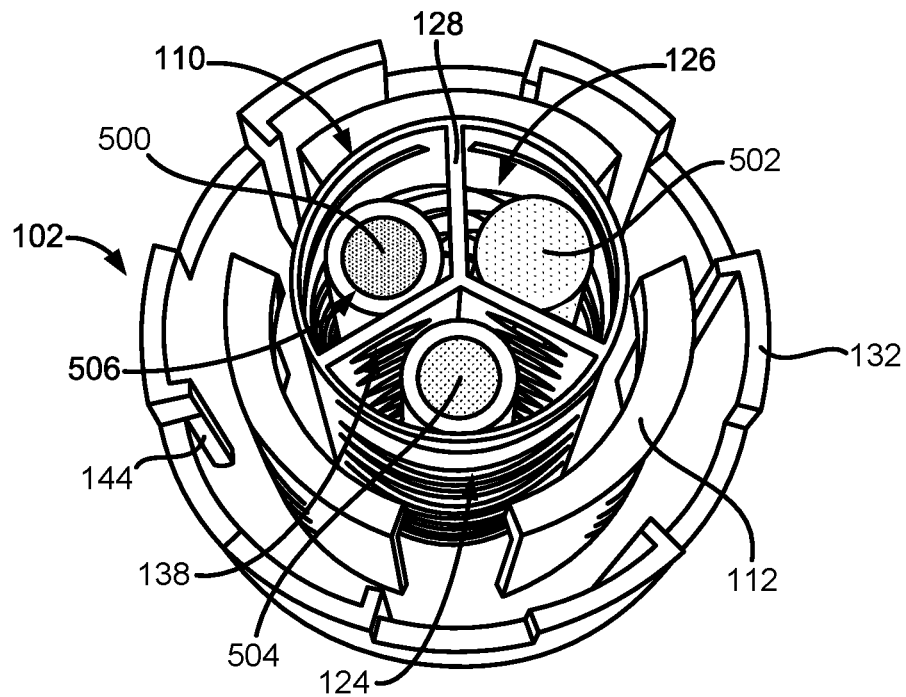
FIG. 5A illustrates a top-down perspective view of one embodiment of a first housing portion with a rehydrating agent, an infusing agent, and a hydrosol infuser positioned or housed within a central column of the first housing portion.
Figure 5B:
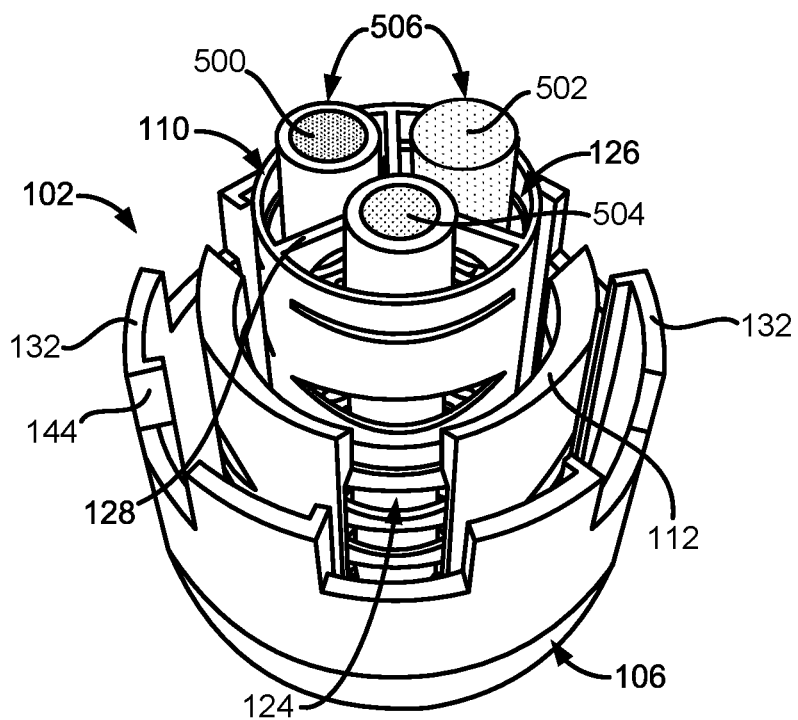
FIG. 5B illustrates another perspective view of one embodiment of the first housing portion with the rehydrating agent, the infusing agent, and the hydrosol infuser positioned or housed within the central column of the first housing portion.

FIGS. 5A and 5B illustrate top down perspective views of one embodiment of the first housing portion 102 with a rehydrating agent 500, an infusing agent 502, and a hydrosol infuser 504 housed within the central column 110 of the first housing portion. As shown in FIGS. 5A and 5B, in some embodiments, each of the compartments 126 within the central column 110 can contain an elongate absorbent 506 and each of the rehydrating agent 500, the infusing agent 502, and the hydrosol infuser 504 can be injected or otherwise introduced into its own elongate absorbent 506.

In some embodiments, the rehydrating agent 500 can be a rehydrating gel configured to rehydrate plant-matter or plant-derived matter stored with the device 100. The rehydrating gel can also comprise aromatic compounds that can be used to infuse the plant or plant-derived matter with certain aromas.

For example, the rehydrating agent can be a rehydrating gel comprising water, a plant-derived hydrosol, a polysaccharide stabilizer, agar, and salt. As a more specific example, the rehydrating agent can be a rehydrating gel comprising approximately (±10%) 48.6% water (wt %), 48.6% hydrosol (wt %), 1.2% polysaccharide stabilizer (wt %), 1.2% agar (wt %), and 0.4% salt (wt %).

In certain embodiments, the polysaccharide stabilizer can be xanthan gum, the agar can be agar-agar derived from red algae, and the salt can be sodium chloride. The plant-derived hydrosol can be a hydrosol derived from hemp plant matter and/or cannabis plant matter. The plant-derived hydrosol can be the same hydrosol discussed in later sections with respect to the hydrosol infuser 504.

For example, the formulation in Table 1 below can be used to make 20 instances (e.g., 20 gel sticks or rolls) of the rehydrating gel (i.e., rehydrating gels used for up to 20 instances of the device 100):

TABLE 1

| Ingredient | Amount |
| --- | --- |
| Water | 4 oz |
| Hydrosol | 4 oz |
| Xanthan gum | 3 grams |
| Agar-agar | 3 grams |
| Salt | 1 gram |

In other embodiments, the rehydrating agent can be a rehydrating fluid comprising water, a plant-derived hydrosol, and salt injected into an elongate absorbent 506. The rehydrating fluid can also be used to saturate the elongate absorbent 506 by submerging or dipping the elongate absorbent 506 into the rehydrating fluid.

In some embodiments, the rehydrating gel can be injected with a wide mouth syringe into a hollow cavity 602 (see, e.g., FIG. 6) of an elongate absorbent 506. In other embodiments, the rehydrating gel can be poured, packed, scooped, or otherwise introduced into the hollow cavity 602 of the elongate absorbent 506. In these and other embodiments, between approximately 15 mL and 30 mL (e.g., about 20 mL) of the rehydrating gel can be injected, poured, packed, scooped, or otherwise introduced into the hollow cavity 602 of the elongate absorbent 506.

In additional embodiments not shown in the figures, the rehydrating gel can be injected or introduced into a compartment 126 within the central column directly (or into another container within the compartment 126).

In some embodiments, the infusing agent 502 can be an oil or other type of viscous liquid comprising volatile or aromatic compounds such as terpenes, thiols, flavonoids, or a combination thereof. For example, the infusing agent 502 can be an oil or viscous liquid comprising terpene isolates. The infusing agent 502 can be an oil or viscous liquid comprising terpenes selected from the group consisting of alpha bisabolol, alpha phellandrene, alpha pinene, alpha-terpineol, beta caryophyllene, beta-pinene, bisabolene, cadinene, camphene, camphor, carvacrol, caryophyllene oxide, cedrene, cinnamaldehyde, citral, citronella, citronellol, delta-3-carene, eucalyptol, eugenol, farnesene, fenchol, gamma terpinene, geranial, geraniol, guaiol, humulene, limonene, linalool, longifolene, myrcene, nerol, nerolidol, ocimene, para-cymene, phytol, pinene, pulegone, terpineol, terpinolene, and valencene.

In certain embodiments, the infusing agent 502 can comprise terpenes or terpene isolates derived from hemp plants. In these and other embodiments, the infusing agent 502 can comprise terpenes or terpene isolates derived from cannabis plants.

The infusing agent 502 can comprise a combination of terpenes, thiols, flavonoids, or other volatile or aromatic compounds suspended or carried by a diluent or carrier. For example, the diluent or carrier can be medium chain triglyceride (MCT) oil, safflower oil, or another type of plant-derived oil. In certain embodiments, the diluent or carrier can be a non-polar organic solvent. In other embodiments, the diluent or carrier can comprise vegetable glycerin, polyethylene glycol, propylene glycol, or a combination thereof.

In some embodiments, the infusing agent 502 can be injected into one or more elongate absorbents 506 using a syringe. In other embodiments, the one or more elongate absorbents 506 can be saturated with the infusing agent 502 by being submerged or dipped into the infusing agent 502.

In certain embodiments, the infusing agent 502 can be injected into a solid absorbent tube 604 (see, e.g., FIG. 6) serving as the elongate absorbent 506. For example, the solid absorbent tube 604 can be a solid cotton tube. In other embodiments, the infusing agent 502 can be injected into a wad of cotton or a rolled-up piece of cotton.

In these and other embodiments, between approximately 3 mL to 7 mL of the infusing agent 502 can be injected into the elongate absorbent 506. In further embodiments, between approximately 7 mL and 10 mL of the infusing agent 502 can be injected into the elongate absorbent 506. In additional embodiments not shown in the figures, the infusing agent 502 can be injected into another type of container housed within a compartment 126 of the central column 110.

In some embodiments, the hydrosol infuser 504 can be a plant-derived hydrosol. Hydrosols are the aqueous byproducts of a distillation process involving leaves, fruits, flowers, or other plant matter. The other byproduct of the distillation process are the essential oils of the plant matter. Hydrosols are also referred to as "flower water," "aromatic water," or "plant water."

For example, the hydrosol infuser 504 can be a hydrosol derived from hemp plant matter. In other embodiments, the hydrosol infuser 504 can be a hydrosol derived from cannabis plant matter. In additional embodiments, the hydrosol can be derived from both hemp and cannabis plant matter.

In some embodiments, the plant-derived hydrosol can be injected into a hollow cavity 602 of an elongate absorbent 506 and the elongate absorbent 506 can be positioned within one of the compartments 126 of the central column 110. For example, between approximately 8 mL and 12 mL (e.g., 10 mL) of the plant-derived hydrosol can be injected into the hollow cavity 602 of the elongate absorbent 506 and the elongate absorbent 506 can be positioned within one of the compartments 126 of the central column 110.

Another technical advantage of the device 100 is that relatively small amounts or volumes of the rehydrating agent, the infusing agent, and hydrosol can be used to quickly and effectively rehydrate plant-matter or plant-derived matter and restore the aromatic or terpene profiles of such matter. This is different from other types of rehydrating and infusing devices which generally require more fluids and/or oils.

A method of assembling the device 100 can comprise positioning or introducing a first instance of the elongate absorbent 506 comprising the rehydrating agent 500 within one of the compartments 126 of the central column 110. As previously discussed, the rehydrating agent 500 can be a rehydrating gel injected, poured, scooped, or packed into a hollow cavity of the elongate absorbent 506 (e.g., injected into a hollow cavity of a hollow cotton tube serving as the elongate absorbent 506).

The method can further comprise positioning or introducing a second instance of the elongate absorbent 506 comprising the infusing agent 502 (e.g., the terpenes, thiols, flavonoids, or other flavor/aroma enhances) within another one of the compartments 126 within the central column 110 of the first housing portion 102. As previously discussed, the infusing agent 502 can be injected into a body of the elongate absorbent 506 (e.g., injected into a body of a solid cotton tube serving as the elongate absorbent 506).

The method can also comprise positioning or introducing a third instance of the elongate absorbent 506 comprising the hydrosol infuser 504 (e.g., the plant-derived hydrosol) within yet another one of the compartments 126 within the central column 110. As previously discussed, the hydrosol infuser 504 can be injected or poured into a hollow cavity of the elongate absorbent 506 (e.g., injected into a hollow cavity of a hollow cotton tube serving as the elongate absorbent 506).

The method can further comprise capping or closing an open end of the central column 110 once the elongate absorbents 506 are housed within the various compartments 126 of the central column 110. The open or distal end of the central column 110 can be capped with the column cap 114 (see, e.g., FIGS. 1A and 2A-2C).

The method can also comprise locking or couple the first housing portion 102 with the second housing portion 104 by pushing a plurality of the second locking tabs 130 of the second housing portion 104 into a space separating the central column 110 from the plurality of first locking tabs 112 and allowing the first locking tabs 112 to interlock with the second locking tabs 130. Once the plurality of first locking tabs 112 have engaged or interlocked with the plurality of second locking tabs 130, the first housing portion 102 can be prevented from separating from the second housing portion 104.

Once the device 100 is assembled, the elongate absorbents 506 within the central column 110 can be barely visible or not visible to a person looking into the device 100 through the main vent openings 136. This is due to the labyrinth or maze-like internal structure of the device 100 formed by the central column 110, the plurality of first locking tabs 112, the plurality of second locking tabs 130, and the second set of blocking panels 134.

Figure 6:
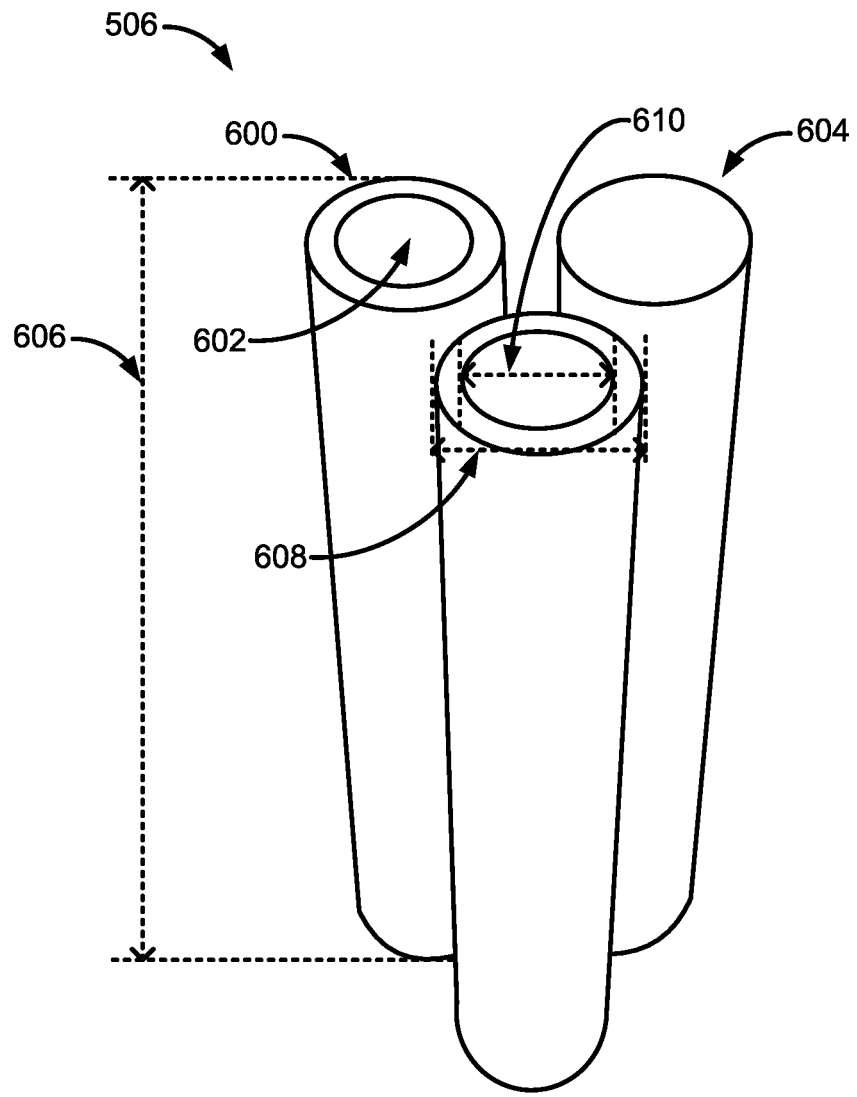
FIG. 6 illustrates embodiments of elongate absorbents used to contain, house, or absorb the rehydrating agent, the infusing agent, or the hydrosol infuser.

FIG. 6 illustrates embodiments of elongate absorbents 506 used to contain, house, or absorb the rehydrating agent 500, the infusing agent 502, or the hydrosol infuser 504. The elongate absorbents 506 can refer to any one of a hollow absorbent tube 600 comprising a hollow cavity 602 defined therein and a solid absorbent tube 604.

For example, the hollow absorbent tube 600 can be a hollow cotton tube or hollow cotton roll. As a more specific example, the hollow cotton tube can be substantially cylindrical-shaped having a hollow cavity 602 defined in a center of the hollow cotton tube.

The solid absorbent tube 604 can be a solid cotton tube or a solid piece of cotton rolled up into a tube or rod-shaped. The solid cotton tube can be substantially shaped as a cylindrical rod.

In some embodiments, the elongate absorbents 506 can be made in part of a natural or organic absorbent material such as cotton or organic cotton. In other embodiments, the elongate absorbents 506 can be made in part of a synthetic material such as an absorbent polymeric material or a polymeric mesh-like material.

Each of the elongate absorbents 506 can have an absorbent height 606 and an absorbent diameter 608 or width. The absorbent height 606 can be a height of the elongate absorbent 506 as measured from a base of the elongate absorbent 506 to a top of the elongate absorbent 506. The absorbent diameter 608 or width can be a diameter or width of the elongate absorbent 506. The absorbent width can be used to refer to an instance of the elongate absorbent which is not cylindrical-shaped (e.g., when the elongate absorbent is shaped as an elongate cuboid).

In some embodiments, the absorbent height 606 can be between approximately 18 mm and 25 mm (e.g., 22 mm). In these and other embodiments, the absorbent diameter 608 or width can be between approximately 10 mm and 15 mm (e.g., 12 mm).

As shown in FIG. 6, when the elongate absorbent 506 is a hollow absorbent tube 600, the elongate absorbent 506 can have a cavity diameter 610 or width. In some embodiments, the cavity diameter 610 can be between approximately 8 mm and 12 mm (e.g., 10 mm).

Although FIGS. 5A-5B and 6 depict the elongate absorbents 506 as rod-shaped or cylindrical-shaped, it is contemplated by this disclosure that the elongate absorbents 506 can be shaped substantially as elongate cuboids, triangular prisms, or other elongate prism shapes. In other embodiments, the elongate absorbents 506 can conform to the shape of the compartments 126 of the central column 110 or start off as one shape but then slowly conform to the shape of the compartments 126.

Also, as previously discussed, when any of the rehydrating agents 500, infusing agents 502, or hydrosol infusers 504 are configured as a gel, the gel, in some embodiments, can be positioned directly in the compartments 126 of the central column 110.

Figure 7:
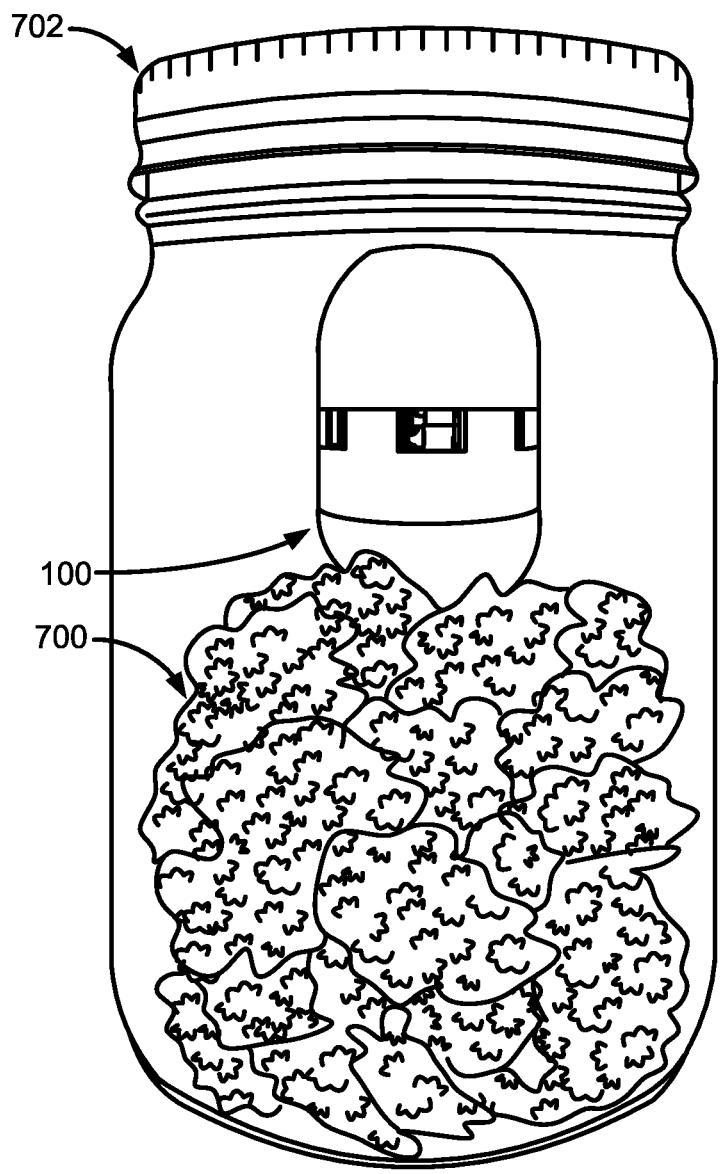
FIG. 7 illustrates one embodiment of the device being used to re-hydrate and infuse plant or plant-derived matter within a sealed container.

FIG. 7 illustrates one embodiment of the device 100 being used to re-hydrate and infuse plant or plant-derived matter 700 within a sealed container 702. Although the container 702 is shown as a jar, it is contemplated by this disclosure that the container 702 can be any one of a sealable bag (e.g., a Ziploc® bag), an oven or Turkey bag, a box, a Tupperware® or other type of rigid polymeric/ceramic container, push-sealed or press-sealed containers, sealable metallic containers, sealable ceramic containers, or a combination thereof.

In some embodiments, the plant or plant-derived matter 700 can refer to cannabis plant matter (e.g., cannabis flowers/buds, leaves, seeds, and/or stems) and any distillates, extracts (e.g., dabs, oils, etc.), or concentrates (e.g., waxes, shatters, badders/batters, budders, resins, rosins, etc.) derived therefrom.

The plant or plant-derived matter 700 can also refer to hemp plant matter (e.g., hemp flowers/buds, leaves, seeds, and/or stems) and any distillates, extracts (e.g., dabs, oils, etc.), or concentrates (e.g., waxes, shatters, badders/batters, budders, resins, rosins, etc.) derived therefrom.

In some embodiments, a method of re-hydrating plant or plant-derived matter 700 and infusing such plant or plant-derived matter with volatile or aromatic compounds can comprise rotating the first housing portion 102 of the device 100 with respect to the second housing portion 104 to open the device 100 or manipulate the device 100 into an open configuration 300. The method can also comprise placing the device 100 within a bag or container 702 containing the plant or plant-derived matter 700 and sealing the bag or container 702 containing the plant or plant-derived matter 700 and the device 100. The method can further comprise allowing the device 100 to be within the sealed bag or container 702 with the plant or plant-derived matter 700 for between 6 hours and 72 hours before retrieving the rehydrated and infused plant or plant-derived matter 700. The simplicity of this method is also one of the technical advantages of the device 100.

Another technical advantage of the device 100 discovered by the applicant is that plant or plant-derived matter 700 can be re-hydrated and infused with certain aromas and flavors in as little as six hours. For example, the applicant discovered that up to 1 pound of plant or plant-derived matter 700 can be re-hydrated or infused with certain aromas or flavors using only one instance of the device 100 (with the dimensions disclosed herein) stored in a sealed container 702 with the plant or plant-derived matter in as little as six hours. In most cases, the device 100 can successfully rehydrate or infuse up to 1 pound of plant or plant-derived matter with certain aromas or flavors in 24 hours or between 24 hours and 72 hours.

The dimensions of the device 100 can be scaled up (for example, using the dimension ratios provided herein) to provide re-hydration or infusion to plant or plant-derived matter 700 up to 2 pounds or greater than 2 pounds. In certain embodiments, the dimensions of the device 100 can also be scaled down to provide re-hydration or infusion to plant or plant-derived matter 700 less than 1 pound or in the range of a few ounces.

In some embodiments, the device 100 can be configured to provide flavor or aroma enhancement for up to four to seven days. In these and other embodiments, the device 100 can be configured to provide rehydration for up to 14 days.

The device 100 can then be disposed of or discarded after this period, making the clean-up process much easier than any other rehydrating or infusing device known to date.

In some embodiments, the device 100 can be used to rehydrate plant or plant-derived matter or infuse such matter with aromas or flavors without added heat (i.e., no external heat or heat source is needed to enable the rehydration or infusion process to work. In other embodiments, the device 100 can be used in a heated environment to further accelerate the rehydration or infusion process.

A number of embodiments have been described. Nevertheless, it will be understood by one of ordinary skill in the art that various changes and modifications can be made to this disclosure without departing from the spirit and scope of the embodiments. Elements of systems, devices, apparatus, and methods shown with any embodiment are exemplary for the specific embodiment and can be used in combination or otherwise on other embodiments within this disclosure. For example, the steps of any methods depicted in the figures or described in this disclosure do not require the particular order or sequential order shown or described to achieve the desired results. In addition, other steps operations may be provided, or steps or operations may be eliminated or omitted from the described methods or processes to achieve the desired results. Moreover, any components or parts of any apparatus or systems described in this disclosure or depicted in the figures may be removed, eliminated, or omitted to achieve the desired results. In addition, certain components or parts of the systems, devices, or apparatus shown or described herein have been omitted for the sake of succinctness and clarity.

Accordingly, other embodiments are within the scope of the following claims and the specification and/or drawings may be regarded in an illustrative rather than a restrictive sense.

Each of the individual variations or embodiments described and illustrated herein has discrete components and features which may be readily separated from or combined with the features of any of the other variations or embodiments. Modifications may be made to adapt a particular situation, material, composition of matter, process, process act(s) or step(s) to the objective(s), spirit or scope of the present invention.

Methods recited herein may be carried out in any order of the recited events that is logically possible, as well as the recited order of events. Moreover, additional steps or operations may be provided or steps or operations may be eliminated to achieve the desired result.

Furthermore, where a range of values is provided, every intervening value between the upper and lower limit of that range and any other stated or intervening value in that stated range is encompassed within the invention. Also, any optional feature of the inventive variations described may be set forth and claimed independently, or in combination with any one or more of the features described herein. For example, a description of a range from 1 to 5 should be considered to have disclosed subranges such as from 1 to 3, from 1 to 4, from 2 to 4, from 2 to 5, from 3 to 5, etc. as well as individual numbers within that range, for example 1.5, 2.5, etc. and any whole or partial increments therebetween.

All existing subject matter mentioned herein (e.g., publications, patents, patent applications) is incorporated by reference herein in its entirety except insofar as the subject matter may conflict with that of the present invention (in which case what is present herein shall prevail). The referenced items are provided solely for their disclosure prior to the filing date of the present application. Nothing herein is to be construed as an admission that the present invention is not entitled to antedate such material by virtue of prior invention.

Reference to a singular item, includes the possibility that there are plural of the same items present. More specifically, as used herein and in the appended claims, the singular forms "a," "an," "said" and "the" include plural referents unless the context clearly dictates otherwise. It is further noted that the claims may be drafted to exclude any optional element. As such, this statement is intended to serve as antecedent basis for use of such exclusive terminology as "solely," "only" and the like in connection with the recitation of claim elements, or use of a "negative" limitation. Unless defined otherwise, all technical and scientific terms used herein have the same meaning as commonly understood by one of ordinary skill in the art to which this invention belongs.

In understanding the scope of the present disclosure, the term "comprising" and its derivatives, as used herein, are intended to be open-ended terms that specify the presence of the stated features, elements, components, groups, integers, and/or steps, but do not exclude the presence of other unstated features, elements, components, groups, integers and/or steps. The foregoing also applies to words having similar meanings such as the terms, "including", "having" and their derivatives. Also, the terms "part," "section," "portion," "member" "element," or "component" when used in the singular can have the dual meaning of a single part or a plurality of parts. As used herein, the following directional terms "forward, rearward, above, downward, vertical, horizontal, below, transverse, laterally, and vertically" as well as any other similar directional terms refer to those positions of a device or piece of equipment or those directions of the device or piece of equipment being translated or moved. Finally, terms of degree such as "substantially", "about" and "approximately" as used herein mean a reasonable amount of deviation (e.g., a deviation of up to ±0.1%, ±1%, ±5%, or ±10%, as such variations are appropriate) from the specified value such that the end result is not significantly or materially changed.

This disclosure is not intended to be limited to the scope of the particular forms set forth, but is intended to cover alternatives, modifications, and equivalents of the variations or embodiments described herein. Further, the scope of the disclosure fully encompasses other variations or embodiments that may become obvious to those skilled in the art in view of this disclosure.

I claim:

1. A rehydrating and infusing device, comprising:
a first housing portion comprising:
a central column, wherein the central column comprises one or more column vents defined along at least one lateral side of the central column, and wherein an interior space within the central column is separated into multiple compartments,
a plurality of first locking tabs positioned radially outward of the central column;
a second housing portion comprising:
a plurality of second locking tabs configured to engage with the plurality of first locking tabs to prevent the first housing portion from separating from the second housing portion when the device is in an assembled configuration, wherein portions of the second locking tabs are configured to be positioned in a space separating the central column from the plurality of first locking tabs when the device is in the assembled configuration;
a rehydrating agent configured to rehydrate plant or plant-derived matter stored with the device, wherein the rehydrating agent is housed within one of the compartments within the central column; and
an infusing agent configured to infuse the plant or plant-derived matter with volatile compounds, wherein the infusing agent is housed within one of the other compartments within the central column.

2. The device of claim 1, wherein at least one of the first locking tabs comprises one or more first locking tab vents, wherein at least one of the second locking tabs comprises one or more second locking tab vents, wherein the first housing portion comprises a first housing shell comprising one or more main vent openings defined along the first housing shell, and wherein the compartments within the central column are in fluid communication with an external environment surrounding the device via the column vents, the second locking tab vents, the first locking tab vents, and the main vent openings when the device is twisted into an open configuration.

3. The device of claim 2, wherein the main vent openings are formed by a first set of blocking panels extending from the first housing shell and arranged in a castellated configuration, wherein the second housing portion further comprises a second set of blocking panels, wherein the second set of blocking panels are configured to obstruct the main vent openings when the device is rotated into a closed configuration by rotating the second housing portion relative to the first housing portion.

4. The device of claim 2, wherein at least one of the first set of blocking panels comprises a blocking piece protruding radially inward, wherein the blocking piece is configured to act as a stopper to block at least one of the second set of blocking panels when the device is in the assembled configuration and the second housing portion is rotated with respect to the first housing portion, and wherein the second housing portion is unable to be rotated 360 degrees as a result of the blocking piece.

5. The device of claim 2, wherein at least some of the column vents, the second locking tab vents, the first locking tab vents, and the main vent openings are positioned radially offset from one another when the device is in the open configuration.

6. The device of claim 1, wherein each of the plurality of first locking tabs comprises a first beveled end and a first locking protrusion, wherein each of the plurality of second locking tabs comprises a second beveled end and a second locking protrusion, wherein the first locking protrusion is configured to interlock or catch onto the second locking protrusion to prevent the first housing portion from separating from the second housing portion when the device is in the assembled configuration.

7. The device of claim 1, wherein the central column comprises a plurality of dividing walls configured to divide the interior space within the central column into the multiple compartments, wherein each of the dividing walls comprises one or more dividing wall vents allowing the multiple compartments to be in fluid communication with one another.

8. The device of claim 1, further comprising a column cap configured to cap an end of the central column when the rehydrating agent and the infusing agent are housed within the central column.

9. The device of claim 1, wherein one of the volatile compounds is a terpene selected from the group consisting of alpha bisabolol, alpha phellandrene, alpha pinene, alpha-terpineol, beta caryophyllene, beta-pinene, bisabolene, cadinene, camphene, camphor, carvacrol, caryophyllene oxide, cedrene, cinnamaldehyde, citral, citronella, citronellol, delta-3-carene, eucalyptol, eugenol, farnesene, fenchol, gamma terpinene, geranial, geraniol, guaiol, humulene, limonene, linalool, longifolene, myrcene, nerol, nerolidol, ocimene, para-cymene, phytol, pinene, pulegone, terpineol, terpinolene, and valencene.

10. The device of claim 1, wherein the rehydrating agent is a gel composed of water, hydrosol, a polysaccharide stabilizer, agar, and salt.

11. The device of claim 1, further comprising one or more elongate absorbents housed within the compartments of the central column, wherein at least one of the rehydrating agent and the infusing agent is injected into the one or more elongate absorbents.

12. The device of claim 11, further comprising a hydrosol infuser housed within the central column, wherein the hydrosol infuser is a plant-derived hydrosol configured to be injected into another one of the elongate absorbents.

13. The device of claim 12, wherein at least one of the elongate absorbents comprises a hollow cavity defined within the elongate absorbent, wherein at least one of the rehydrating gel and the plant-derived hydrosol is injected into the hollow cavity.

14. A method of re-hydrating plant or plant-derived matter and infusing the plant or plant-derived matter with volatile or aromatic compounds, comprising:
rotating a first housing portion of a device with respect to a second housing portion of the device to open the device,
wherein the first housing portion comprises:
a central column, wherein the central column comprises one or more column vents defined along at least one lateral side of the central column, and wherein an interior space within the central column is separated into multiple compartments,
a plurality of first locking tabs positioned radially outward of the central column,
wherein the second housing portion comprises a plurality of second locking tabs configured to engage with the plurality of first locking tabs to prevent the first housing portion from separating from the second housing portion, wherein portions of the second locking tabs are configured to be positioned in a space separating the central column from the plurality of first locking tabs when the device is in an assembled configuration, and
wherein the central column comprises a rehydrating agent configured to rehydrate the plant or plant-derived matter and an infusing agent configured to infuse the plant or plant-derived matter with volatile compounds;
placing the device within a bag or container containing the plant or plant-derived matter; and
sealing the bag or container containing the plant or plant-derived matter and the device.

15. The method of claim 14, wherein the plant matter is cannabis plant matter and wherein the plant-derived matter is a concentrate, extract, or distillate of the cannabis plant matter.

16. The method of claim 14, wherein the plant matter is hemp plant matter and wherein the plant-derived matter is a concentrate, extract, or distillate of the hemp plant matter.

17. A method of assembling a rehydrating and infusing device, comprising:
positioning a first elongate absorbent comprising a rehydrating agent within one of a plurality of compartments within a central column of a first housing portion of the device, wherein the central column comprises one or more column vents defined along at least one lateral side of the central column, and wherein the first housing portion comprises a plurality of first locking tabs positioned radially outward of the central column;
positioning a second elongate absorbent comprising an infusing agent comprising terpenes within another one of the plurality of compartments within the central column of the first housing portion;
capping or closing an open end of the central column; and
locking the first housing portion to a second housing portion of the device by pushing a plurality of second locking tabs of the second housing portion into a space separating the central column from the plurality of first locking tabs and allowing the first locking tabs to interlock with the second locking tabs to prevent the first housing portion from separating from the second housing portion.

18. The method of claim 17, further comprising positioning a third elongate absorbent comprising hydrosol infuser within yet another one of the plurality of compartments within the central column of the first housing prior to capping or closing the open end of the central column.

19. A rehydrating and infusing device, comprising:
a first housing portion comprising a central column,
a second housing portion configured to couple to the first housing portion and prevent the first housing portion from separating from the second housing portion when the device is in an assembled configuration,
a rehydrating agent configured to rehydrate plant or plant-derived matter stored with the device, wherein the rehydrating agent is housed within at least part of the central column, wherein the rehydrating agent comprises water, hydrosol, a polysaccharide stabilizer, agar, and salt; and
an infusing agent configured to infuse the plant or plant-derived matter with terpenes, wherein the infusing agent is housed within at least part of the central column.

20. The device of claim 19, wherein the rehydrating agent comprises approximately:
48.6% water (wt %);
48.6% hydrosol (wt %);
1.2% polysaccharide stabilizer (wt %);
1.2% agar (wt %); and
0.4% salt.

\* \* \* \* \*